US006152038A

United States Patent [19]

Wagner et al.

[11] Patent Number: 6,152,038

[45] Date of Patent: Nov. 28, 2000

[54] MEDIA AND METHOD FOR PROVIDING UV PROTECTION

[75] Inventors: Barbara Wagner; Ming Xu, both of Mt. Pleasant, S.C.

[73] Assignee: Sawgrass Systems, Inc., Mt. Pleasant, S.C.

[21] Appl. No.: 09/322,214

[22] Filed: May 28, 1999

[51] Int. Cl.[7] .............................. B41L 35/14; B32B 27/14

[52] U.S. Cl. ............................ 101/488; 428/195; 347/105

[58] Field of Search .............................. 101/488; 428/198, 428/201, 334, 35.4; 347/105

[56] References Cited

U.S. PATENT DOCUMENTS

| | | | |
|---|---|---|---|
| 4,515,849 | 5/1985 | Keino et al. | 428/201 |
| 4,756,963 | 7/1988 | Yamamoto | 428/334 |
| 4,912,085 | 3/1990 | Marbrow | 428/195 |
| 5,210,067 | 5/1993 | Egashira et al. | 428/195 |
| 5,223,314 | 6/1993 | Watanabe et al. | 428/35.4 |
| 5,707,925 | 1/1998 | Akada et al. | 428/195 |
| 5,851,720 | 12/1998 | Shinohara | 347/105 |

*Primary Examiner*—Eugene Eickholt

*Attorney, Agent, or Firm*—B. Craig Killough

[57] ABSTRACT

An intermediate media having a transferable UV stabilizer receives a printed image. A transferable UV absorber and/or free radical scavenger is present. The image, or dye layer, and UV stabilizer are transferred to a final substrate during subsequent heat transfer and activation. Alternatively, the UV stabilizer may be heat transferred from the intermediate transfer media onto a previously transferred image. The UV stabilizer is resistant to laundering at elevated temperatures after transfer and imparts no hand to the final substrate. The intermediate transfer media may comprise multiple layers including a layer containing one or more UV stabilizers. A release layer may be applied beneath the UV stabilizer layer. The release and UV stabilizer layers may sit beneath a dye screening layer. One layer may be a liquid permeable, gas impermeable membrane.

12 Claims, 1 Drawing Sheet

MEDIA AND METHOD FOR PROVIDING UV PROTECTION

BACKGROUND OF THE INVENTION

Heat transfer printing processes involve physically transferring a printed image from one substrate to another. One heat transfer method is melt transfer printing. A design is printed on paper using a waxy ink. The back side is then heated with pressure, while the printed side is in close contact with a final substrate. The ink melts onto the final substrate in the mirror image of the original image.

Another method of transfer printing is film release transfer. The image is printed onto a paper substrate coated with a film of heat tackifiable resin. Upon application of heat and pressure to the back side of the image, the entire film containing the image is transferred to the final substrate. The printing method used in this invention most commonly employs heat activated dyes, such as sublimation dyes. One form of an appropriate transfer process using liquid sublimation inks is described in Hale, et al., U.S. Pat. No. 5,601,023, the teachings of which are incorporated herein by reference. An image is printed onto an intermediate media using heat activated dyes. Heat and pressure are applied to the back side of the media while the image is in close contact with a final substrate. The dyes vaporize and are preferentially diffused into and/or absorbed by the final substrate to form the image on the substrate. The release of the dye during transfer depends on the vapor pressure of the dye and on the rate of diffusion of the dye vapor through the layers of the paper, and the affinity of the dye for the substrate materials such as binders and additives contained in the paper substrate.

Sublimation or heat sensitive ink printing generally requires an intermediate sheet. The intermediate sheet may be paper. The paper may contain an ink acceptor material capable of readily absorbing the ink and allowing droplets to coalesce, yet maintaining high resolution and color density. For effective sublimation transfer to take place, a liquid ink must be readily absorbed into the body of the media while the dye and/or dyes must remain relatively close to the surface of the media. The dyes used in sublimation transfer inks are relatively low in molecular weight and contain minimal active functional groups that inhibit volatility. The dyes are typically chosen from the disperse dye class. Such dyes are substantially insoluble in water or organic solvents. Dispersion of these dyes within the carrier is necessary to produce the ink, and printing of the ink so formed by commonly available digitally driven color printers, such as ink jet printers, requires a dye particle size of less than a few microns.

Images formed from pigments or dyes and subjected to sunlight experience loss of color due to degradation of the colorant material. This photodegradation is caused largely by ultraviolet (UV) radiation from the sunlight. Ultraviolet radiation from artificial light can cause similar changes. The presence of moisture and heat accelerates this degradation. There are two broad classes of UV light stabilizers. One class of compounds is ultraviolet light absorbers (UVA) that act by absorbing harmful UV radiation. An example of a UVA is a benzotriazole, which acts by dissipating UV energy as harmless heat energy. The second class of UV light stabilizers is free radical scavengers. An example of a free radical scavenger is a hindered amine light stabilizer, or HALS. Hindered amine light stabilizers do not absorb UV radiation, but rather scavenge free radicals formed by the breaking of molecular bonds.

Binders or laminates containing UV stabilizers for covering a printed image to protect it from harmful radiation have been used. For example, Yamamoto, et al., U.S. Pat. No. 4,756,963 describes a transfer layer comprised primarily of a thermoplastic resin and containing a UV absorber. The transfer layer is laminated onto the surface of an image. Watanabe, et al., U.S. Pat. No. 5,223,314 describes a cover film with a layer of an "anti-contamination" material composed of a resin which has no affinity for a sublimation-type dyestuff, such as polyethylene, polypropylene, or Teflon, and a UV absorber. Fujimura, et al., U.S. Pat. No. 5,397,763 describes the use of a heat transfer ribbon which may be comprised of a dye dyeable resin, a sublimation dye, and a protective layer, which may contain a UV absorber. An image may then be transferred from this heat transfer sheet via a thermal head to a final substrate, such as paper, in the order such that the dyeable resin is laid down first, followed by the dye, and then the protective layer.

A UV protector has been added to an image or dye receiving layer of a substrate. For example, Tomita, et al., U.S. Pat. No. 5,783,517 describes the use of a copolymer of phenoxypolyethylene glycol-acrylate or -methacrylate and another monomer, along with a UV absorber and/or light stabilizer for increasing the light resistance of images formed thereon. Kushi, et al., U.S. Pat. No. 5,218,019 describes the use of a polyester resin, a cross-linking agent, a releasing agent and a benzotriazole UV stabilizer for forming an image receiving paper or film for sublimation-type thermal dye transfer methods. Sam, et al., U.S. Pat. No. 5,635,441 describes a dye receiving layer on a printing sheet comprised of a butyral resin, a vinylphenolic resin, a polyisocyanate compound, and an optional UV absorber.

Images printed onto an intermediate media using heat activated, or sublimation, dyes may be transferred to synthetic fabric as a final substrate. Fabrics printed in such a manner may be exposed to UV radiation, for example, polyester and polypropylene sportswear. It would be beneficial to be able to provide UV protection to garments printed in such a manner. It is common practice in the textile dyeing field to use UV absorbers and/or hindered amine light stabilizers in the dyeing process to impart some degree of UV protection to the fabric or to the wearer of the fabric. Other methods of imparting this UV protection to synthetic fibers is to incorporate the UV stabilizers into the polymeric backbone during formation of the polymer or to add the UV stabilizer during formation of the fiber.

SUMMARY OF THE INVENTION

The present invention relates to an intermediate media containing a transferable UV stabilizer. The intermediate transfer media containing a transferable UV stabilizer is capable of receiving a printed image, such as a digitally printed image. The image received by the transfer media is capable of transfer, either due to the properties of the media, or due to the properties of the dye, or both. The process may be practiced using transfer paper, and using heat activated dyes, such as sublimation dyes. The image, or dye layer, and UV stabilizer are transferred to a final substrate during subsequent heat transfer and activation. Alternatively, the UV stabilizer may be heat transferred from the intermediate transfer media onto a previously transferred image. The UV stabilizer heat transfers from the intermediate substrate with the printed image, but is resistant to laundering at elevated temperatures after transfer. The UV stabilizer, along with the printed image impart no hand to the final substrate.

The intermediate transfer media may comprise multiple layers including a layer containing one or more UV stabilizers. A release layer may be applied beneath the UV stabilizer layer. The release layer is a thin layer of material capable of releasing the UV stabilizer(s) from the remaining intermediate transfer media during heat transfer, without negatively affecting the resolution of the printed image. In one embodiment of the invention, the optional release layer and UV stabilizer layer are formed on an existing sheet of transfer media, e.g., a paper for particular printing applications.

In another embodiment of this invention, the optional release and UV stabilizer layers sit beneath a dye screening layer comprised of a porous material. The dye screening layer holds the solid dye particles close to the surface of the media, and allows the other materials in the ink to pass through. The distance that the dye must traverse to the final substrate is thereby reduced, and the presence of other materials in the ink does not interfere with the activation or sublimation of the dye.

An optional fourth permeation control layer is a liquid permeable, gas impermeable membrane. This semipermeable membrane allows liquids, such as aqueous or non-aqueous solution, to pass through to subsequent layers during printing, while preventing dye vapor from penetrating beyond the dye receptive layer during the final transfer step. In other words, this layer ensures that the direction of the dye vapor migration is towards the final substrate, and prevents vapor of water or solvent from penetrating back into the dye receptive layer during the final heat transfer step. The fifth layer is an ink absorbent layer, followed by a support layer. The dye screening and/or ink absorbent layers may contain chemicals that produce an exotherm upon application of sufficient heat. Addition of these exothermic chemicals provides a means of minimizing the amount of externally applied energy necessary for transferring an image from the intermediate media to the final substrate.

An object of this invention is to provide an intermediate transfer media containing a transferable UV absorber and/or free radical scavenger. It is another object of the present invention to provide a method for imparting UV protection to fabrics printed via heat transfer. It is another object of this invention to provide an intermediate transfer media containing a transferable UV absorber and/or free radical scavenger and a transferable image produced thereon. It is another object of this invention to provide a method of preparing an intermediate transfer media containing a transferable UV absorber and/or free radical scavenger to a previously prepared intermediate transfer media. It is still a further object of this invention to provide a method of preparing an intermediate transfer media containing multiple layers, including a UV radiation absorbing and/or free radical scavenger layer and an optional release layer. It is another object of this invention to provide methods of producing UV protected transferred images.

DESCRIPTION OF THE PREFERRED EMBODIMENT

Figure 1:
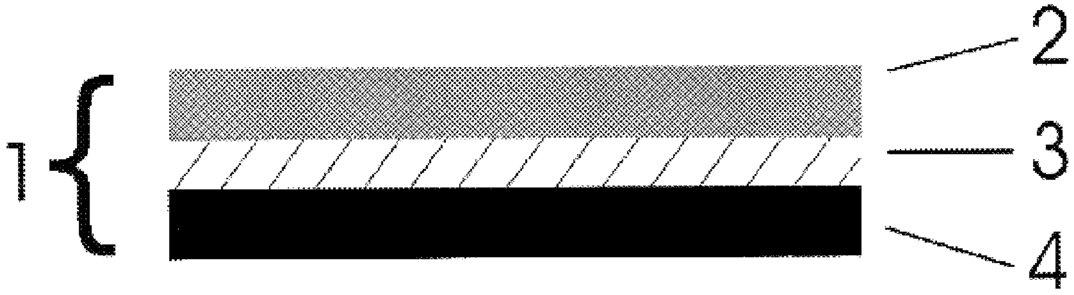
FIG. 1 shows a cross-section of an intermediate transfer media (1) of the invention in which the base sheet (4) is coated on one side with an optional thin film of release layer (3) and an ultraviolet light stabilizer layer (2).

The ultraviolet stabilizer layer is present on the surface or just below the surface of the intermediate transfer sheet and is preferred to comprise a layer of a UV absorber capable of absorbing ultraviolet rays in the 290–450 nm wavelength range and/or a free radical scavenger. Suitable UV absorbers are any conventionally known agents, for example, benzophenone, benzotriazole, salicylate, oxalanilide, pyrimidine, cyanoacrylate, and acrylonitrile type absorbers. Suitable free radical scavengers are any known in the art, such as hindered amine light stabilizers and sebacates. Optionally, the ultraviolet light stabilizer layer may contain an antioxidant, for example, hindered phenol. The ultraviolet stabilizer layer should be of thickness 1–50 microns, preferably 1–10 microns. The ultraviolet stabilizer layer may be applied to a previously prepared intermediate transfer sheet (4) as shown in FIG. 1. It may be applied via a coating process or sprayed onto the previously prepared transfer media (2). When the intermediate transfer media is to be prepared from a previously prepared transfer media (4), hereinafter referred to as base sheet, a release layer (3) may first be applied to the base sheet (4). This may be applied in the form of a spray or by any coating process known in the art. The release layer will be a thin film of thickness 0.1–2 microns. Examples of release agents include solid waxes, such as amide wax, polyethylene wax, Teflon powder; phosphate- or fluorine-containing surfactants; and silicone-containing compounds.

Figure 2:
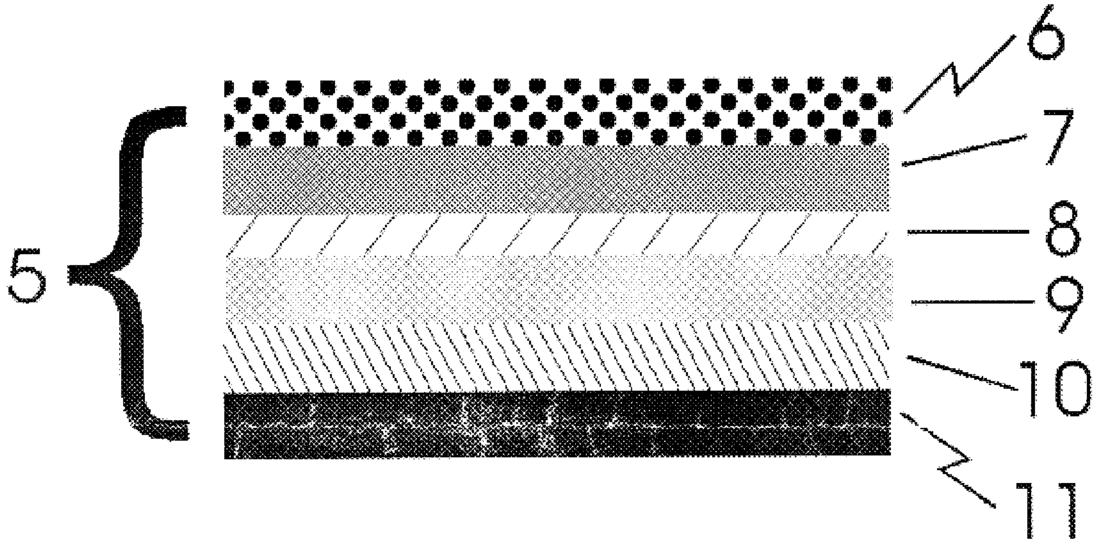
FIG. 2 shows a detailed cross-section of another embodiment of an intermediate transfer media (5) in which the support substrate (11) is coated on one side with an ink absorptive layer (10), an optional liquid permeable, gas impermeable permeation control layer (9), an optional release layer (8), a UV stabilizer layer (7), and a dye screening layer (6).

FIG. 2 illustrates a multi-layered intermediate transfer media. It is generally desirable that the colorant penetrate the media to the minimal effective level, since excessive penetration affects the image definition. Image definition is also improved by minimizing the distance the dye vapor traverses after sublimation and during transfer to reach the final substrate. For these reasons it is desirable to have a dye screening layer (6) at the surface of the media. A porous membrane may be used to filter, or screen, dye particles from the bulk of a liquid ink. Suitable membranes include microporous membranes whose pores are fine enough to retain the dye particles, yet allow minimum resistance to the passage of a liquid component of the ink, which may contain water, solvents, co-solvents, humectants, dispersants, and/or surfactants. Microporous membranes may include sheets and hollow fibers typically formed from polymeric material and having a substantially continuous matrix structure containing open pores of small size. The pore size range of microporous membranes generally range from 0.05–10 microns in diameter. Typically, a pore diameter of approximately 0.05 microns should suffice to trap the sublimation dye particles. Examples of suitable membranes are, but are not limited to those made of high molecular organic material such as Teflon, those made of inorganic materials, such as porous ceramic, porous graphite or zirconium-coated graphite membranes, polymeric materials, such as polyolefin, polysulfone, polyethersulfone, cellulose, or the like. Below the dye screening layer (6), is a UV stabilizer layer (7), followed by an optional release layer (8), both as described above, their total thickness being 1–50 microns, preferably 1–10 microns.

Another embodiment of the present invention may be used with liquid inks, and primarily aqueous inks, in which insoluble dye particles are present. This embodiment incorporates a substantially porous material having a pore size small enough to allow only the dissolved liquid molecules to pass through, while retaining the undissolved dye particles.

The mean pore diameter, for example, may be less than 0.05 microns. The material is sufficiently tightly packed and treated, so that there is minimal void volume, and no dye is allowed to flow through and between the porous particles. In this way the relatively large dye particles are effectively screened from the bulk of the ink and held in this screening layer close to the surface of the media. The liquid portion of the ink penetrates this layer.

The dye receptive layer may additionally contain a heat sensitive material which exotherms upon application of sufficient heat. As heat is externally supplied to the receiver/transfer media during transfer of the printed image from the dye screening layer to the final substrate, additional heat is generated by the exotherm reaction. The additional heat lowers the amount of externally applied energy which is necessary to transfer the dye from the dye receptive layer to the final substrate, and/or reduces transfer time. Examples of such exothermic materials are aromatic azido compounds, such as 4,4'-bis(or di)azido-diphenylsulfone which will undergo thermal decomposition with the loss of molecular nitrogen as the only volatile component, and the formation of an electron-deficient species and rapid energy dissipation and stabilization. Other examples are aromatic azido compounds carrying a water-solubilizing group, such as a sulfonic acid or carboxylic acid group. These exothermic materials typically show an exotherm in the temperature range of 170–200° C. Typical heat transfer temperatures are in the range of 175–215° C.,and are thus sufficient to initiate this exotherm.

A permeation control layer (9) may be included. This layer has a semipermeable membrane which is substantially permeable to liquids and substantially impermeable to gases. As shown is in FIG. 2, for example, the layer is positioned between the optional release layer (8) and the absorbent layer (10). The permeation control layer allows liquid from the ink to pass through a dye receptive layer to the absorbent layer during printing, and prevents dye vapor from back-diffusing in the direction of the absorbent layer during transfer to the final substrate. The membrane also prevents vapor associated with the solvent, co-solvent or water in the absorbent layer from penetrating and traversing back into the top, dye-containing layers. Such vapor competes with the dye sublimation vapor, and decreases the transfer efficiency, image quality, and/or final fastness quality of such transferred image on the final substrate, while increasing the transfer time and/or energy requirements for transfer. Examples of suitable semipermeable membranes are disclosed in U.S. Pat. No. 5,330,459, and include Nylon 6 film, polyvinylchloride film, Rohm & Haas high Acrylonitrile barrier film, and a cellulose acetate film as disclosed in U.S. Pat. No. 5,108,383.

Absorbent layer (10) absorbs the bulk of the liquid ink. Liquid inks used with the media may contain water, emulsifying enforcing agents, solvents, co-solvents, humectants, dispersants, and/or surfactants. Absorbent materials for ink printing papers are well known in the art and include, but are not limited to, porous materials such as silica gel, aluminum oxide, zeolites, porous glass; polymers based on methacrylate, acrylate, and the like; monomers with suitable cross-linking agents such as divinylbenzene; liquid swellable materials such as clays and starches, for example, montmorillonite type clays; fillers, such as calcium carbonate, kaolin, talc, titanium dioxide, and diatomaceous earth. Water-soluble polymers, such as polyvinyl alcohol, modified polyvinyl alcohol, cellulose derivatives, casein, gelatin, sodium alginate, and chitosin are typically used as binders. Water-insoluble polymers may be used as binders. Examples of such are styrene-butadiene copolymers, acrylic latex, and polyvinyl acetate. The absorbent layer may contain chemicals which react irreversibly with water and/or solvents to render them non-volatile. An example of such a chemical is polyvinyl alcohol. The ink absorbent layer (10) may contain an exothermic material as described above.

The support (11) is typically a sheet material which can be transparent, translucent, or opaque. Useful transparent or translucent materials include, for example, cellulose acetate, polyethylene terephthalate, polystyrene, polyvinylchloride, and the like. Useful opaque materials include paper made of natural cellulose fiber materials, polyethylene-clad paper, opaque filled paper, and the like. The base layer can be coated with a subbing layer to increase the adhesion of the absorbent layer to the base.

Heat sensitive or heat activated dyes may be disperse dyes, reactive disperse dyes, basic dyes, or solvent dyes which can be sublimated or thermally diffused at 325–450° F., preferably 375–425° F. Examples of such are C.I. Disperse 14 (cyan), C.I. Disperse Yellow 54 (yellow), C.I. Disperse Red 60 (red), Solvent Red 155 (red), etc.

Ultraviolet radiation protection of transferred images may be imparted in a number of ways. One method is to print an image onto an intermediate transfer media as described above, e.g., one that contains an optional release layer and a UV stabilizer layer, using heat activated, or sublimation, dyes, followed by heat activation of the image on the back side, thereby transferring the image and the UV absorber and/or free radical scavenger onto the fabric or other final substrate.

Another method for imparting UV radiation protection to an image is to heat transfer a UV absorber and/or a free radical scavenger from an intermediate transfer sheet as described in FIGS. 1 or 2 to a final substrate with a previously transferred or printed image thereon.

Another method of providing UV radiation protection to an image transferred onto a final substrate is to wet the final substrate with, for example, water, after heat transferring an image produced by heat activated, or sublimation, dyes. This is followed by transferring an intermediate transfer media as described by FIG. 1 or FIG. 2, e.g., containing a UV absorber and/or free radical scavenger, onto the previously transferred image on the final substrate. This steaming, or thermosol-type treatment, of the fabric may help to permanently fix the UV absorber and/or free radical scavenger to the fabric. Another method of providing UV radiation protection to an image is to first transfer the UV absorber and/or free radical scavenger from the intermediate transfer media as described by FIG. 1 or FIG. 2 by applying heat to the back side of the intermediate media placed with the UV stabilizer layer or dye screening layer (FIGS. 1 and 2, respectively) in contact with the final substrate, which may be wet or dry, preferably wet, to the final substrate. An image printed using heat activated, or sublimation, dyes on any transfer media is then heat transferred to the final substrate onto the previously transferred UV stabilizer layer.

EXAMPLES

Commercially available Avery Brilliant Color Inkjet Paper was used for Examples 1–12. Black ink consists of a mixture of disperse dyes Intratherm Brown P-1301 and Intratherm Blue P-1404 (Disperse Blue 14) both available from Crompton & Knowles Colors, Inc. Cyan ink contains Intratherm Blue P-1404. Disperse Blue 14 was chosen because of its poor light-fastness, and therefore, quick results could be obtained.

Example 1

Avery paper is sprayed with a light coat of PTFE Release Agent Dry Lubricant available from Miller-Stephenson Chemical Company, Inc. and allowed to air-dry. The paper is then sprayed with an approximately 3% solids dispersion of Sunlife LPX-3 UV Absorber, available from NICCA U.S.A., Inc., and allowed to air-dry. The total thickness of the PTFE plus Sunlife LPX-3 coatings is approximately 5 microns. The paper is then printed with stripes of black and cyan using an Epson 3000 printer, followed by heat transfer to knit polyester fabric for 20 seconds at 400° F.

Example 2

Avery paper is sprayed with a light coat of PTFE Release Agent Dry Lubricant, then sprayed with a 3% solids dispersion of Sunlife LPX-3 and allowed to air-dry. The paper is then printed with stripes of black and cyan, followed by heat transfer to knit polyester fabric for 20 seconds at 400° F. The swatch is then washed in hot water with Tide detergent and air-dried.

Example 3

Avery paper is sprayed with a 3% dispersion of Sunlife LPX-3 and allowed to air-dry to give a 5 micron coating. The paper is then printed with black and cyan stripes and heat transferred to knit polyester fabric for 20 seconds at 400° F.

Example 4

Avery paper is printed with black and cyan stripes and heat transferred to knit polyester fabric for 20 seconds at 400° F. A separate sheet of Avery paper is sprayed with a light coating of PTFE Release Agent Dry Lubricant followed by a 3% dispersion of Sunlife LPX-3 and allowed to dry. The PTFE/LPX-3 sheet is then heat transferred onto the previously transferred black and cyan stripes for 20 seconds at 400° F.

Example 5

Avery paper is printed with black and cyan stripes and heat transferred to knit polyester fabric for 20 seconds at 400° F., then soaked with water. A separate sheet of Avery paper is sprayed with a light coating of PTFE Release Agent Dry Lubricant followed by a 3% dispersion of Sunlife LPX-3 and allowed to dry. The PTFE/LPX-3 sheet is then heat transferred onto the moist, previously transferred black and cyan stripes for 10 seconds at 400° F.

Example 6

Avery paper is printed with black and cyan stripes and heat transferred to knit polyester fabric for 20 seconds at 400° F., then soaked with water. A separate sheet of Avery paper is sprayed with a light coating of PTFE Release Agent Dry Lubricant followed by a 3% dispersion of Sunlife LPX-3 and allowed to dry. The PTFE/LPX-3 sheet is then heat transferred onto the moist, previously transferred black and cyan stripes for 20 seconds at 400° F.

Example 7

Avery paper is sprayed with a light coat of PTFE Release Agent Dry Lubricant and allowed to air-dry. The paper is then sprayed with a 3% solids dispersion of Cibafast P UV Absorber, available from Ciba Specialty Chemicals Corporation, and allowed to air-dry. The total thickness of the PTFE plus Cibafast P coatings is approximately 5 microns. The paper is then printed with stripes of black and cyan using an Epson 3000 printer, followed by heat transfer to knit polyester fabric for 20 seconds at 400° F.

Example 8

Avery paper is sprayed with a light coat of PTFE Release Agent Dry Lubricant and allowed to air-dry. The paper is then sprayed with a 3% solids dispersion of Cibafast P UV Absorber and allowed to air-dry. The paper is then printed with stripes of black and cyan, followed by heat transfer to knit polyester fabric for 20 seconds at 400° F. The swatch is then washed in hot water with Tide detergent and tumble-dried.

Example 9

Avery paper is printed with black and cyan stripes and heat transferred to knit polyester fabric for 20 seconds at 400° F. A separate sheet of Avery paper is sprayed with a light coating of PTFE Release Agent Dry Lubricant followed by a 3% dispersion of Cibafast P and allowed to dry. The PTFE/Cibafast P sheet is then heat transferred onto the previously transferred black and cyan stripes for 10 seconds at 400° F.

Example 10

Avery paper is printed with black and cyan stripes and heat transferred to knit polyester fabric for 20 seconds at 400° F., then soaked with water. A separate sheet of Avery paper is sprayed with a light coating of PTFE Release Agent Dry Lubricant followed by a 3% dispersion of Cibafast P and allowed to dry. The PTFE/Cibafast P sheet is then heat transferred onto the moist, previously transferred black and cyan stripes for 20 seconds at 400° F.

Example 11

Avery paper is sprayed with a light coat of PTFE Release Agent Dry Lubricant and allowed to air-dry. The paper is then printed with black and cyan stripes and heat transferred to knit polyester fabric for 20 seconds at 400° F.

Example 12

Avery paper is printed with black and cyan stripes and heat transferred to polyester fabric for 20 seconds at 400° F. Swatches from Examples 1–12 were taped to a board and exposed to South Carolina summer sun for 2 weeks. The optical densities of the black and cyan prints on polyester fabric were read using an X-Rite 418 Densitometer both before and after two weeks of sun exposure. Table 1 shows the percent improvement in light-fastness for the treated swatches versus the untreated, or control, swatch (Example 12). One column shows the percent improvement for the cyan component of the black ink, the other column shows the percent improvement in the light-fastness of the cyan component of the cyan ink.

TABLE 1

| Example Number | % Improvement | % Improvement |
|---|---|---|
| 1 | 35 | 46 |
| 2 | 39 | 60 |
| 3 | 40 | 39 |
| 4 | 21 | 32 |
| 5 | 37 | 18 |

TABLE 1-continued

| Example Number | % Improvement | % Improvement |
|---|---|---|
| 6 | 33 | 57 |
| 7 | 78 | 67 |
| 8 | 57 | 85 |
| 9 | 59 | 70 |
| 10 | 43 | 38 |
| 11 | 0 | 0 |
| 12 | control | control |

The results from Table 1 show that use of a UV absorber provides UV radiation protection when applied to polyester fabric. Although improvements were measured for both one- and two-step transfer processes versus the control, better light-fastness results were obtained when the black/cyan image and UVA were applied in one-step (Examples 1 vs. 4 and 7 vs. 9).

The idea of wetting the printed fabric prior to heat transfer of the UV absorber is that this steam treatment may mimic a thermosol-type treatment and help to "fix" the UV absorber into the fabric. It was found that wetting the fabric prior to transfer of the black/cyan image and the UVA in one-step provided better light-fastness than transferring the same to dry polyester (Examples 6 vs. 4). In the case where the black/cyan image is first transferred to the fabric, followed by transfer of the UV absorber of Examples 7–10, dry fabric gives better light-fastness results than wet (Examples 9 vs. 10). Again, each sample provided an improvement in light-fastness versus the control, which does not contain any UV absorber. (The fabric can not be wetted just prior to transfer of the black/cyan stripes because the steam escaping from the fabric competes with the vapor from the sublimation dyes from the transfer media leading to a blurred image.)

It was shown that for the UV absorber of Examples 1–6, heat transfer for 20 seconds at 400° F. is enough to fix the UV absorber to the fabric because of the fact that similar results were obtained whether the swatch was washed prior to sun exposure or not (Examples 2 vs. 1). It appears that 10 seconds is not long enough at 400° F. to fix the UV absorber to the fabric as evidenced by the large difference in light-fastness of Examples 6 (20 seconds) versus 5 (10 seconds).

The use of the release agent PTFE Release Agent Dry Lubricant may not be necessary, as the results were similar whether a release agent was used or not (Examples 3 vs. 1).

It was shown that the release agent does not play a role in improved light-fastness because the black/cyan image treated with release agent alone (Example 11), shows no improvement in light-fastness versus the control, which has no UV absorber.

What is claimed:

1. A method of printing an image having enhanced protection against ultraviolet light, comprising the steps of:

a. preparing an intermediate substrate comprising a base layer, said base layer having on at least one surface thereof at least one ultraviolet light stabilizing material;

b. forming a printed image on said intermediate substrate by printing an ink on said intermediate substrate and over said at least one ultraviolet light stabilizing material, wherein said ink comprises a heat sensitive dye; and c. applying heat to said intermediate substrate to activate said heat sensitive dye and transferring at least a portion of said heat sensitive dye and at least a portion of said at least one ultraviolet light stabilizing material from said intermediate substrate to a final substrate by the application of said heat to said intermediate substrate.

2. A method of printing an image having enhanced protection against ultraviolet light as described in claim 1, wherein said intermediate substrate further comprises a release layer.

3. A method of printing an image having enhanced protection against ultraviolet light as described in claim 1, wherein said intermediate substrate further comprises a permeation control layer which is substantially liquid permeable and is substantially gas impermeable.

4. A method of printing an image having enhanced protection against ultraviolet light as described in claim 1, wherein said intermediate substrate further comprises a dye screening layer.

5. A method of printing an image having enhanced protection against ultraviolet light as described in claim 1, wherein said intermediate substrate further comprises a exothermic material.

6. A method of printing an image having enhanced protection against ultraviolet light as described in claim 2, wherein said intermediate substrate further comprises a exothermic material.

7. A method of printing an image having enhanced protection against ultraviolet light as described in claim 3, wherein said intermediate substrate further comprises a exothermic material.

8. A method of printing an image having enhanced protection against ultraviolet light as described in claim 4, wherein said intermediate substrate further comprises a exothermic material.

9. A method of printing an image having enhanced protection against ultraviolet light as described in claim 2, wherein said intermediate substrate further comprises a permeation control layer which is substantially liquid permeable and is substantially gas impermeable.

10. A method of printing an image having enhanced protection against ultraviolet light as described in claim 2, wherein said intermediate substrate further comprises a dye screening layer.

11. A method of printing an image having enhanced protection against ultraviolet light as described in claim 3, wherein said intermediate substrate further comprises a dye screening layer.

12. A method of printing an image having enhanced protection against ultraviolet light as described in claim 9, wherein said intermediate substrate further comprises a dye screening layer.

* * * * *